(12) United States Patent
Agrawal

(10) Patent No.: US 12,177,064 B2
(45) Date of Patent: Dec. 24, 2024

(54) SYSTEM, METHOD, AND NON-TRANSITORY COMPUTER-READABLE MEDIA FOR PROVIDING SUBSEQUENT AND CORRELATED ALARM LISTS

(71) Applicant: Rakuten Mobile, Inc., Tokyo (JP)

(72) Inventor: Amit Agrawal, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 0 days.

(21) Appl. No.: 17/997,369

(22) PCT Filed: Jul. 29, 2022

(86) PCT No.: PCT/US2022/038826
§ 371 (c)(1),
(2) Date: Oct. 28, 2022

(87) PCT Pub. No.: WO2024/025554
PCT Pub. Date: Feb. 1, 2024

(65) Prior Publication Data
US 2024/0275667 A1 Aug. 15, 2024

(51) Int. Cl.
*H04L 41/0686* (2022.01)
*H04L 41/0631* (2022.01)

(52) U.S. Cl.
CPC ...... *H04L 41/0686* (2013.01); *H04L 41/0631* (2013.01)

(58) Field of Classification Search
CPC . H04L 41/0686; H04L 41/06; H04L 41/0604; H04L 41/0609; H04L 41/0613;
(Continued)

(56) References Cited

U.S. PATENT DOCUMENTS 6,601,185 B1 * 7/2003 Bass ............... H04L 41/0618
714/25
6,707,795 B1 * 3/2004 Noorhosseini ...... H04L 41/0631
370/242
(Continued)

FOREIGN PATENT DOCUMENTS

EP        2439877 A1 *   4/2012   ......... H04L 41/0631
WO   WO-2012116716 A1 * 9/2012   ......... H04L 41/0631
WO   WO-2023021642 A1 * 2/2023   ......... H04L 41/0686

OTHER PUBLICATIONS

Huawei et al., "Alarm Root-Cause Identification for Petrochemical Process System Based on Fluctuation Correlation Analysis," 1. SINOPEC Research Institute for Safety Engineering Qingdao, Key State Laboratory of Safety and Control for Chemicals Qingdao, IEEE. (Year: 2019).*
(Continued)

*Primary Examiner* — Alina A Boutah
(74) *Attorney, Agent, or Firm* — HAUPTMAN HAM, LLP

(57) ABSTRACT

At least one subsequent and correlated alarm is linked to a primary alarm. In an alarm list library, at least one subsequent and correlated alarm attribute is added to a primary alarm. The primary alarm having the alarm name attribute in the alarm list library is received at a network management system. The at least one subsequent and correlated alarm attribute is applied to the alarm name attribute associated with the alarm received at the network management system. The alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the
(Continued)

alarm received at the network management system are displayed.

20 Claims, 6 Drawing Sheets

(58) Field of Classification Search
CPC ...... H04L 41/0631; G06F 17/00; G06F 11/22; G04L 61/30
See application file for complete search history.

(56) References Cited

U.S. PATENT DOCUMENTS

| | | | |
|---|---|---|---|
| 6,757,727 B1* | 6/2004 | Ivory | ............ H04L 41/02 370/242 |
| 6,816,461 B1* | 11/2004 | Scrandis | ............ H04L 41/0631 370/242 |
| 6,862,698 B1* | 3/2005 | Shyu | ............ G06F 11/079 709/224 |
| 2011/0138291 A1* | 6/2011 | Twiddy | ............ H04L 41/06 715/735 |
| 2016/0218911 A1* | 7/2016 | Wessels | ............ H04L 43/045 |
| 2019/0356535 A1* | 11/2019 | Li | ............ H04L 41/0631 |
| 2022/0086036 A1* | 3/2022 | Wang | ............ H04L 41/0631 |
| 2023/0318905 A1* | 10/2023 | Venkataraman | ............ H04L 41/0883 |

OTHER PUBLICATIONS

Bouloutas et al., "Alarm Correlation and Fault Identification in Communication Networks," IEEE Transactions on Communications, vol. 42, No. U3/4, Feb. Mar. Apr. 1994. (Year: 1994).*

* cited by examiner

SYSTEM, METHOD, AND NON-TRANSITORY COMPUTER-READABLE MEDIA FOR PROVIDING SUBSEQUENT AND CORRELATED ALARM LISTS

RELATED APPLICATIONS

The present application is a National Phase of International Application No. PCT/US2022/038826, filed Jul. 29, 2022.

TECHNICAL FIELD

This description relates to a system, method, and non-transitory computer-readable media for providing subsequent and correlated alarm lists.

BACKGROUND

In a telecom environment, an "alarm" is generated for a wide variety of reasons. In response to a severity of an alarms being minor, a regular maintenance visit to the cause of the alarm is scheduled. More serious alarms, such as major and critical alarms are to be given an immediate response. An immediate response is scheduled because the integrity of the network is severely at risk.

The collection and aggregation of alarms is handled by computers and a combined, list of alarms is displayed for human staff to process. Modern telecommunication networks produce thousands of alarms per day thereby making the task of real-time network surveillance and fault management difficult. Due to the large volume of alarms, network operators frequently overlook or misinterpret them. To reduce the number of alarms displayed on operators' terminals, current network management systems apply alarm filtering procedures or send them directly to a printer or database.

Currently, alarm attributes are defined independently for the alarms. Engineers are aware of a concept of alarm correlation and primary/secondary alarm. As of now, correlations between alarms are defined manually. Engineers rely on their past experience to determine which subsequent alarm might be raised that points to the same problem. For individual alarms, there is not a way for an engineer to know which subsequent alarms are generated that point to the same problem as an after-effect of the alarm under investigation.

SUMMARY

In at least embodiment, a method for linking at least one subsequent and correlated alarm to a primary alarm includes adding, in an alarm list library, at least one subsequent and correlated alarm attribute to a primary alarm having an alarm name attribute indicating a name of the primary alarm, the at least one subsequent and correlated alarm attribute indicating at least one subsequent and correlated alarm linked to the alarm name attribute of the primary alarm, receiving, at a network management system, the primary alarm having the alarm name attribute in the alarm list library, applying the at least one subsequent and correlated alarm attribute to the alarm name attribute in the alarm list library associated with the alarm received at the network management system, and displaying the alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the alarm received at the network management system.

In at least embodiment, a device for linking at least one subsequent and correlated alarm to a primary alarm includes a memory storing computer-readable instructions, and a processor connected to the memory, wherein the processor is configured to execute the computer-readable instructions to add, in an alarm list library, at least one subsequent and correlated alarm attribute to a primary alarm having an alarm name attribute indicating a name of the primary alarm, the at least one subsequent and correlated alarm attribute indicating at least one subsequent and correlated alarm linked to the alarm name attribute of the primary alarm, receive, at a network management system, the primary alarm having the alarm name attribute in the alarm list library, apply the at least one subsequent and correlated alarm attribute to the alarm name attribute in the alarm list library associated with the alarm received at the network management system, and display the alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the alarm received at the network management system.

In at least embodiment, a non-transitory computer-readable media having computer-readable instructions stored thereon, which in response to being executed by a processor causes the processor to perform operations including adding, in an alarm list library, at least one subsequent and correlated alarm attribute to a primary alarm having an alarm name attribute indicating a name of the primary alarm, the at least one subsequent and correlated alarm attribute indicating at least one subsequent and correlated alarm linked to the alarm name attribute of the primary alarm, receiving, at a network management system, the primary alarm having the alarm name attribute in the alarm list library, applying the at least one subsequent and correlated alarm attribute to the alarm name attribute in the alarm list library associated with the alarm received at the network management system, and displaying the alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the alarm received at the network management system.

BRIEF DESCRIPTION OF THE DRAWINGS

Aspects of the present disclosure are best understood from the following detailed description when read with the accompanying figures. It is noted that, in accordance with the practice in the industry, various features are not drawn to scale. In fact, the dimensions of the various features are able to be increased or reduced for clarity of discussion.

DETAILED DESCRIPTION

Figure 1:
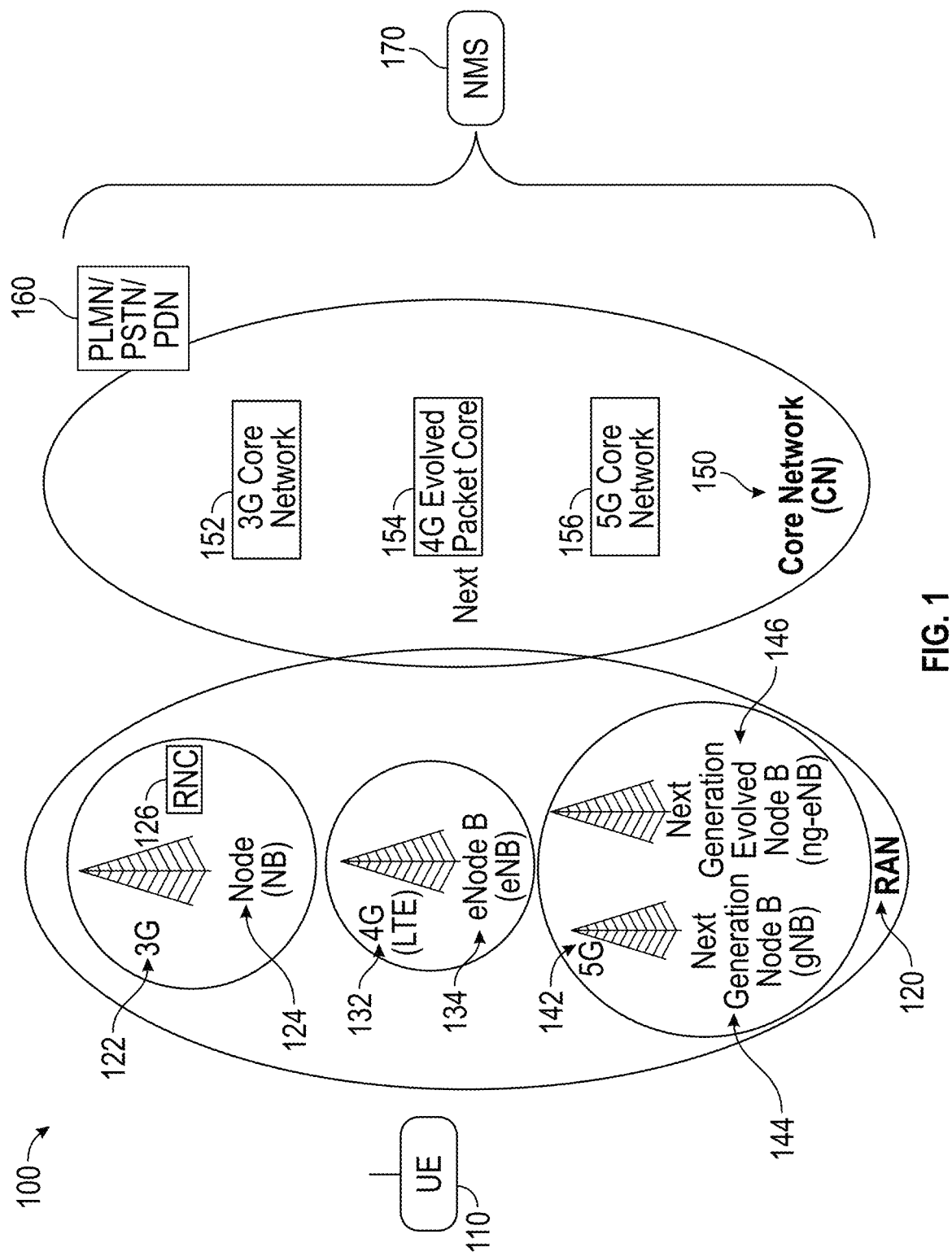
FIG. 1 illustrates a mobile network according to at least one embodiment.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of the device in use or operation in addition to the orientation depicted in the FIGS. The apparatus is otherwise oriented (rotated 90 degrees or at other orientations) and the spatially relative descriptors used herein likewise are interpreted accordingly.

Embodiments described herein describes examples for implementing different features of the provided subject matter. Examples of components, values, operations, materials, arrangements, or the like, are described below to simplify the present disclosure. These are, of course, examples and are not intended to be limiting. Other components, values, operations, materials, arrangements, or the like, are contemplated. For example, the formation of a first feature over or on a second feature in the description that follows include embodiments in which the first and second features are formed in direct contact and include embodiments in which additional features are formed between the first and second features, such that the first and second features are unable to make direct contact. In addition, the present disclosure repeats reference numerals and/or letters in the various examples. This repetition is for the purpose of simplicity and clarity and does not in dictate a relationship between the various embodiments and/or configurations discussed.

In a telecom environment, an "alarm" is generated for a wide variety of reasons. Alarm systems also reflect software and hardware failures. Engineers are aware of a concept of alarm correlation and primary/secondary alarm. However, for individual alarms, there is not a way for an engineer to know which subsequent alarms are generated that point to same problem as an after-effect of the alarm under investigation. As of now, correlations are defined manually where engineers rely on their past experience to determine which subsequent alarm might be raised that points to the same problem.

According to at least one embodiment, a Subsequent and Correlated Alarms List is added to an Alarm Library or Alarm Specification. The Subsequent and Correlated Alarms List includes a list of possible subsequent alarms pointing to same problem. These Subsequent and Correlated Alarms List are associated with alarms that have been generated or will be generated during the problem occurrence event lifetime. Based on the Subsequent and Correlated Alarms List, in response to an alarm being generated the alarm includes an additional attribute which includes a Subsequent and Correlated Alarms List that points to same problem.

In an alarm list library, at least one subsequent and correlated alarm attribute is added to a primary alarm having an alarm name attribute indicating a name of the primary alarm, the at least one subsequent and correlated alarm attribute indicating at least one subsequent and correlated alarm linked to the alarm name attribute of the primary alarm. At a network management system, the primary alarm having the alarm name attribute in the alarm list library is received. The at least one subsequent and correlated alarm attribute is applied to the alarm name attribute in the alarm list library associated with the alarm received at the network management system. The alarm name based on the alarm name attribute in the alarm list library associated with the alarm is received at the network management system, and the at least one subsequent and correlated alarm indicated by the at least one subsequent and correlated alarm attribute linked to the alarm name attribute in the alarm list library associated with the alarm received at the network management system are displayed.

Advantages of linking at least one subsequent and correlated alarm to a primary alarm include providing a ready reference to the list of subsequent possible alarms to enable automated fault handling so that the engineer focuses on critical alarms. Automation is able to be completed at the fingertips as the subsequent and correlated alarm lists will be readily available. Actual impact severity is easily determined, and an engineer is able to determine, based on knowledge of the operation of the network, whether an alarm is an expected alarm or an unexpected alarm. Recovery time is also minimized, and engineers are able to develop their skills by understanding the relationship and after-effects.

FIG. 1 illustrates a mobile network 100 according to at least one embodiment.

In FIG. 1, a mobile telecommunication network couples User Equipment (EU) 110 through Radio Access Network (RAN) 120 to a Core Network (CN) 150. RAN 120 connects individual devices, such as User Equipment (EU) 110 to other parts of a network, e.g., CN 150, through radio connections. RAN 120 is responsible for managing radio resources, including strategies and algorithms for controlling power, channel allocation and data rate.

There have been many different types of RANs 120 as mobile networks have evolved from 3G to 5G. For example, RANs 120 are implemented in various configurations, such as Global System for Mobile Communications (GSM) RAN (GRAN), GSM Enhanced Data Rates for GSM Evolution (EDGE) RAN (GERAN), Universal Mobile Telecommunications Service (UMTS) Terrestrial RAN (UTRAN), Evolved UMTS Terrestrial RAN (E-UTRAN), Centralized/Cloud RAN (CRAN), Virtualized RAN (VRAN), and Open RAN (ORAN).

In a 3G network 122, RAN 120 includes the base station, which is called a Node B (NB) 124, and a Radio Network Controller (RNC) 126. RNC 126 controls and manages the radio transceivers in Node Bs 124, as well as manages operational functions, such as handoffs, and the radio channels. The RNC 126 handles communication with the 3G Core Network 152.

In a 4G network 132, the Evolved Node B (eNodeB or eNB) 134 is the radio base station. The eNodeB 134 is able to perform the radio access functions that are equivalent to the combined work that Node B and RNC do in 3G and connect to the Evolved Packet Core 154.

In a 5G network 142, there are two types of RANs: Next Generation Node B (gNodeB) 144 and Next Generation Evolved Node B (ng-eNB) 146. The ng-eNB 146 is an enhanced version of 4G eNodeB and connects 5G UE 110 to the 5G Core Network (5GC) 156 using 4G LTE air interface. The gNB 144 allows 5G UE 110 to connect with a 5GC 156 using 5G NR air interface. The gNBs 144 and ng-eNBs 146 are interconnected by means of the Xn interface. The gNBs 144 and ng-eNBs 146 are also connected by means of the NG interfaces to the 5GC 156.

In 5G, for example, an Open RAN environment is able to be implemented wherein the RAN 120 is separated into the Radio Unit (RU), the Distributed Unit (DU), and the Centralized Unit (CU). The RU is where the radio frequency signals are transmitted, received, amplified, and digitized. The RU is located near or integrated into, the antenna. The DU and CU are the computation parts of the base station, sending the digitalized radio signal into the network. The DU is physically located at or near the RU whereas the CU is often located nearer the Core Network. The different interfaces associated with the Open RAN 120 include the Fronthaul (FH) that lies between the RU and the DU, the Midhaul (MH) that lies between the DU and the CU, and the Backhaul (BH) that lies between the CU and the Core Network.

Core Network (CN) 150 connects RAN 120 to networks 160, such as a Public Landline Mobile Network (PLMN), a Public Switched Telephone Network (PSTN) and a Packet Data Network (PDN). CN 150 provides high-level traffic aggregation, routing, call control/switching, user authentication and charging. The 3G CN 152 involves two different domains: circuit switched elements and packet switched elements. The 4G Evolved Packet Core (EPC) 154 includes four main network elements: the Serving Gateway (S-GW), the packet data network (PDN) Gateway (P-GW), the mobility management entity (MME), and the Home Subscriber Server (HSS). The S-GW routes and forwards data packets from the UE and acts as the mobility anchor during inter-eNodeB handovers. The P-GW acts as an ingress and egress point to the EPC from a PDN (Packet Data Network) such as the Internet. The MME manages UE access network and mobility, as well as establishing the bearer path for User Equipment (UE). The MME is also concerned with the bearer activation/deactivation process. The HSS is the master database for a given subscriber, acting as a central repository of information for network nodes. Subscriber related information held by the HSS includes user identification, security, location, and subscription profile. The EPC is connected to the external networks, which includes the IP Multimedia Core Network Subsystem (IMS). 5GC 156 supports new network functions (NFs) associated with the packet core and user data management domains. 5GC 156 provides a decomposed network architecture with the introduction of a service-based interface (SBI), and control plane and user plane separation (CUPS). 5GC decomposes the 4G MME into an Access and Mobility Management Function (AMF) and a Session Management Function (SMF). The AMF receives connection and session related information from the UE, but is responsible for handling connection and mobility management tasks. Messages related to session management are forwarded to the SMF.

The network is managed by the network management system (NMS) 170, which provides several network management functionalities. One of the primary functions of the NMS is fault management, where diagnosing and addressing network faults takes place.

Figure 2:
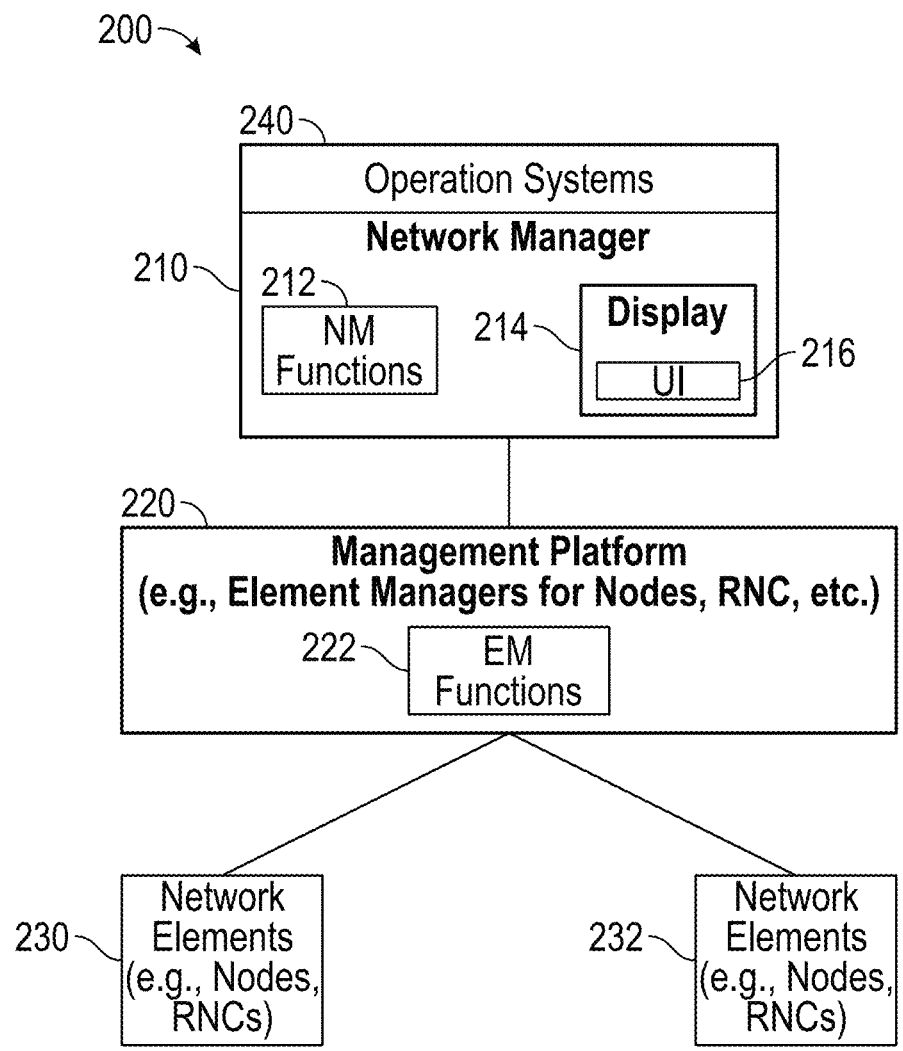
FIG. 2 illustrates a network management system according to at least one embodiment.

FIG. 2 illustrates a network management system 200 according to at least one embodiment.

In FIG. 2, a Network Manager (NM) 210 is coupled to at least one Element Manager (EM) 220. An EM 220 is coupled to at least one Network Element (NE) 230.

NM 210 provides NM functions 212 for the management of a network that is supported by EM(s) 220. The NM 210 is also involved in direct access to the NEs 230, 232. Communication with the network is based on interfaces supporting management of multivendor and multi-technology NEs 230, 232. An Operations System (OS) 240 provides fault management services and functions used by the operator on top of the element management layer.

EM 220 provides EM functions 222 for management of a set of related types of NEs 230. NEs 230, 232 are discrete telecommunications entities. NEs 230, 232 are managed over a specific interface, e.g., the RNC.

NM 210 receives alarms associated with issues occurring in the mobile network. For example, a primary alarm having an alarm name attribute in an alarm list library is received. The alarms are associated with one or more of the following categories:

Hardware failures, i.e., the malfunction of some physical resource within a NEs 230, 232.

Software problems, e.g., software bugs, database inconsistencies.

Functional faults, i.e., a failure of some functional resource in NEs 230, 232 and no hardware component is found that is responsible for the problem.

Loss of some or all of the specified capability of NEs 230, 232 due to overload situations.

Communication failures between NEs 230, 232, or between NEs 230, 232 and NM 210 and Operations System 240.

As a consequence of faults, appropriate alarms related to the physical or logical resource(s) affected by the fault(s), are generated by the network entities. For example, NEs 230, 232 detect faults using autonomous self-check circuits/procedures, including, in the case of NEs 230, 232, the observation of measurements, counters and thresholds. The threshold measurements are predefined by the manufacturer and executed autonomously in NEs 230, 232, or the threshold measurements are based on performance measurements administered by the EM 220.

NM 210 receives alarm attributes that are used to classify alarms. For example, in at least one embodiment, at least one subsequent and correlated alarm attribute is applied to an alarm name attribute in an alarm list library associated with the alarm received at NM 210. NM 210 is also able to classify alarms according to classification, service impact, severity, and priority. For Fault Management (FM) purposes, NEs 230, 232 store and retain a list of active alarms, i.e., alarms that have not yet been cleared, and alarm history information, i.e., notifications related to the occurrence and clearing of alarms.

NM 210 characterizes faults by at least one of events, event correlation, root causes, errors, failures or faults, and symptoms. An event is a condition occurring in the operation of hardware or software within the network managed; an instantaneous occurrence at a time. Event correlation is the process of establishing relationships between network events. Root causes are events that cause other events but are not caused by other events; they are associated with an abnormal state of network infrastructure. An error is a discrepancy between an observed or computed value or condition and a true value or condition, assumed to be correct. A failure or fault is considered to be network error. Symptoms are external manifestations of failures (errors) which are observed as alarms.

NM 210 supports fault diagnosis, which involves three processes: fault detection, fault localization (also known as fault isolation or root cause analysis) and testing the possible solutions. Fault detection is the process of collecting information related to malfunctions of the NEs 230, 232 in the form of alarms. In at least one embodiment, NM 210 includes a Display 214 that presents a User Interface (UI) 216, wherein alarms are automatically presented on the UI 216 upon detection. Fault localization or root cause analysis (RCA) is the process of identifying the causes of faults. RCA includes several stages of correlating events (including alarms) which occurred over a certain period of time, and is based on technical knowledge about the system being analyzed. Alarm correlation is the process of grouping alarms which refer to the same problem, in order to highlight those which indicate the possible root cause.

Figure 3:
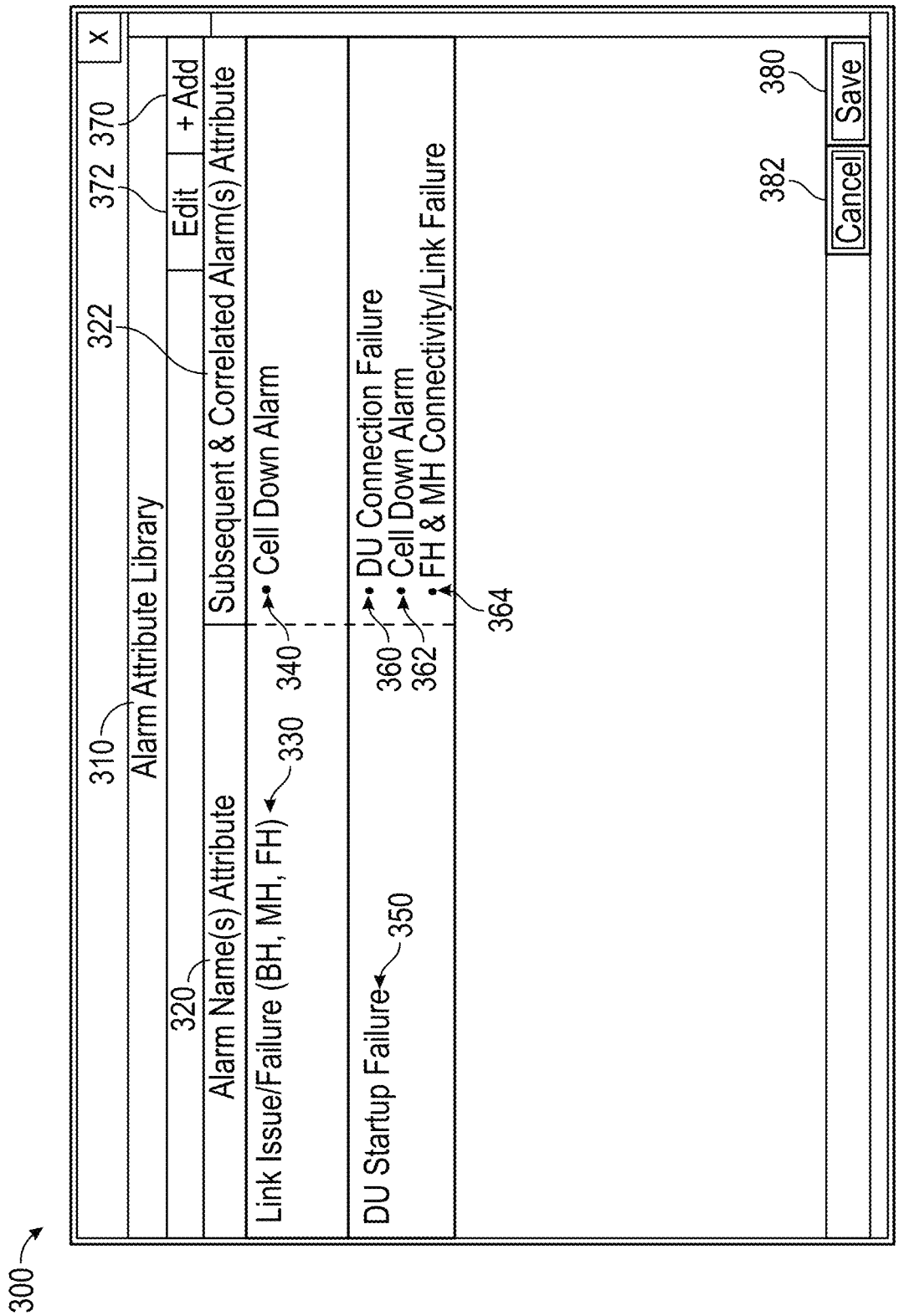
FIG. 3 illustrates an Alarm Management User Interface (UI) according to at least one embodiment.

FIG. 3 illustrates an Alarm Management User Interface (UI) 300 according to at least one embodiment.

In FIG. 3, Alarm Management User Interface (UI) 300 allows Alarm Attribute Library 310 to be configured. Alarm Attribute Library 310 includes a column that shows Alarm Name(s) Attribute 320 and a column for displaying Subsequent and Correlated Alarm(s) Attribute 322. The Alarm Name(s) Attribute 320 identifies a primary alarm.

In FIG. 3, two listings are shown under Alarm Name(s) Attribute 320. First, under Alarm Name(s) Attribute 320 an alarm having a name of Link Issue/Failure alarm 330 is shown. Link Issue/Failure alarm 330 is associated with an issue or failure of the Backhaul (BH), the Midhaul (MH), and the Fronthaul (FH) interfaces. Link Issue/Failure alarm 330 is a primary alarm.

A link between the components of a RAN deteriorates in quality to a level that communications is not able to continue. In this case, the RAN declares a radio link failure (RLF). The Link Issue/Failure alarm 330 is shown associated with a Subsequent & Correlated Alarm(s) Attribute 322 referred to as Cell Down Alarm 340 that has been added to the Alarm Attribute Library 310. Thus, Cell Down Alarm 340 is a secondary alarm. The Cell Down Alarm 340 follows from a Link Issue/Failure alarm 330 because the link failure affects one or more cells associated with a RAN.

A second alarm is shown under Alarm Name(s) Attribute 320 having a name of Distributed Unit (DU) Startup Failure 350. DU Startup Failure 350 is a primary alarm. For DU Startup Failure 350, the DU detects an outage of a radio link. The DU transmits a parameter indicating the outage to the CU. Distributed Unit (DU) Startup Failure 350 is shown associated with a plurality of Subsequent & Correlated Alarm(s) Attributes 322 that have been added to the Alarm Attribute Library 310: DU Connection Failure Alarm 360, Cell Down Alarm 362, and FH & MH Connectivity/Link Failure Alarm 364. DU Connection Failure Alarm 360, Cell Down Alarm 362, and FH & MH Connectivity/Link Failure Alarm 364 are secondary alarms. A DU Connection Failure Alarm 360 follows from a DU Startup Failure 350 because a connection failure occurred between UE and the DU. A Cell Down Alarm 362 follows from a DU Startup Failure Alarm 350 because the DU Startup Failure causes a cell associated with the DU to not function. FH & MH Connectivity/Link Failure 364 follows from a DU Startup Failure 350 because the DU communicates with the CU using the MH interface and communicates with the RU using the FH interface. In response to the DU experiencing a startup failure, the FH and MH links fail.

In at least one embodiment, Alarm Management User Interface (UI) 300 includes an "+Add" control button 370 for adding subsequent & correlated alarm attributes to an alarm listed under Alarm Name(s) Attribute 320. In at least one embodiment, Alarm Management User Interface (UI) 300 includes an "Edit" control button 372 to allow an engineer to modify the subsequent & correlated alarm attributes associated with an alarm listed under Alarm Name(s) Attribute 320. In at least one embodiment, Alarm Management User Interface (UI) 300 includes a "Save" control button 380 that allows an engineer to save any changes made, and a "Cancel" control button 382 that allows an engineer to abandon any attempted changes. However, those skilled in the art recognize that additional controls are able to be implemented or omitted according to embodiments described here.

Embodiments described herein provide a Subsequent and Correlated Alarms List Attribute 322 to allow subsequent & correlated alarms to be added to an Alarm Library or Alarm Specification. The Subsequent and Correlated Alarms List Attribute 322 links at least one subsequent and correlated alarm to a primary alarm associated the same problem, i.e., the associated alarm listed under Alarm Name(s) Attribute 320. The Subsequent and Correlated Alarms List Attribute 322 is associated with alarms that are generated during the problem occurrence event lifetime associated with the respective alarm listed under Alarm Name(s) Attribute 320. Based on the Subsequent and Correlated Alarms List Attribute 322, in response to an alarm being generated the alarm will have an additional attribute which provides a Subsequent and Correlated Alarms List pointing to same problem associated with the respective alarm listed under Alarm Name(s) Attribute 320.

Subsequent and Correlated Alarm(s) Attribute 322 is added to the Alarm Attribute Library 310. The Subsequent & Correlated Alarm(s) Attribute 322 is independent of domain, i.e., able to be used in any domain such as RAN, CN, Transport etc., and for hardware and software categories. The Subsequent & Correlated Alarm(s) Attribute 322 is also able to be implement by vendors and OEM manufacturers.

Figure 4:
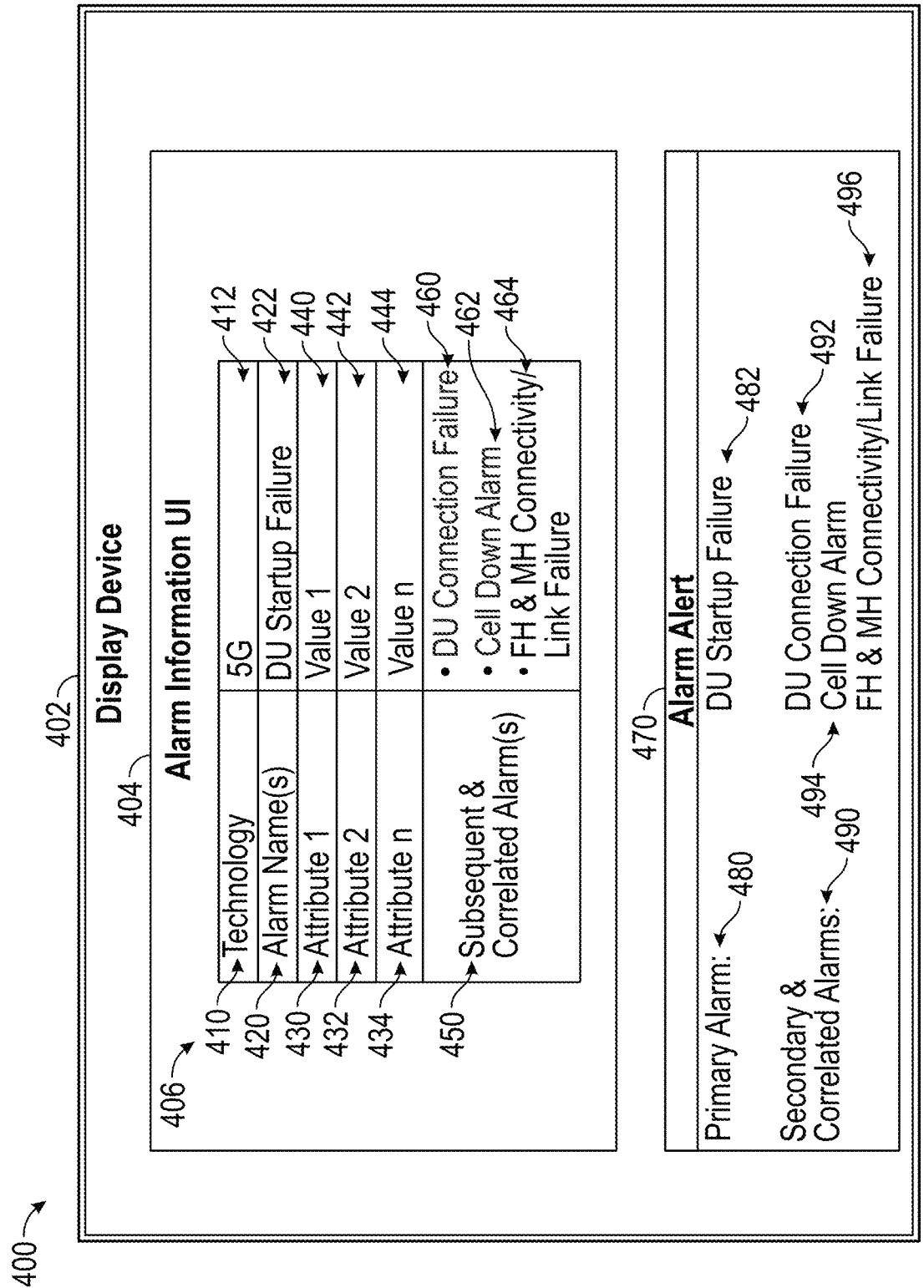
FIG. 4 illustrates alarm information according to at least one embodiment.

FIG. 4 illustrates a display of alarm information 400 according to at least one embodiment.

In FIG. 4, a Display Device 402 presents an Alarm Information User Interface (UI) 404. UI 404 presents Alarm Information 406. In at least one embodiment, Alarm Information 406, including identification of a primary alarm and one or more subsequent and correlated alarms are automatically displayed upon detection of the primary alarm. Alarm Information 406 includes a Technology header 410 and a corresponding indication of the technology, wherein 5G 412 is shown here. Alarm Name(s) is identified as DU Startup Failure alarm 422. DU Startup Failure alarm 422 is a primary alarm. In at least one embodiment, additional information is provided via additional alarm attributes. As shown in FIG. 4, additional alarm attributes, Attribute 1 430, Attribute 2 432, Attribute n 434, are linked to Value 1 440, Value 2 442, Value n 442, respectively. For example, Attribute 1 430 is associated with a "Major" priority indication and Value 1 440 is associated with a count for occurrences of the "Major" priority indication. In a similar manner, Attribute 2 432 is associated with a "Critical" priority indication and Value 2 442 is associated with a count for occurrences of the "Critical" priority indication, and Attribute n 434 is associated with a "Emergency" priority indication and Value n 444 is associated with a count for occurrences of the "Emergency" priority indication. However, those skilled in the art recognize that additional or alternative attributes and values are able to be implemented. In at least one embodiment, Alarm Information 406 omits the attributes and values.

In FIG. 4, Subsequent & Correlated Alarm(s) 450 are displayed with associated Alarm Name(s) 420. For example, in FIG. 4, Subsequent & Correlated Alarm(s) 450 are displayed along with DU Connection Failure Alarm 460, Cell Down Alarm 462, and FH & MH Connectivity/Link Failure Alarm 464. Thus, Alarm Information 406 shows that Alarm Name(s) 420 of DU Startup Failure 422 is associated with Subsequent & Correlated Alarm(s) 450 of DU Connection Failure Alarm 460, Cell Down Alarm 462, and FH & MH Connectivity/Link Failure Alarm 464. DU Connection Failure Alarm 460, Cell Down Alarm 462, and FH & MH Connectivity/Link Failure Alarm 464 are secondary alarms.

The Subsequent and Correlated Alarms List 450 provides a list of subsequent alarms pointing to the same problem, i.e., the associated alarm listed under Alarm Name(s) 420. The Subsequent and Correlated Alarms List 450 is associated with alarms that are generated during the problem occurrence event lifetime associated with the respective alarm listed under Alarm Name(s) 420. Based on the Subsequent and Correlated Alarms List 450, in response to DU Startup Failure alarm 422 being generated, Alarm Information 406 includes an additional attribute which provides a Subsequent and Correlated Alarms List 450 pointing to the respective alarm listed under Alarm Name(s) 420. Subsequent and Correlated Alarms List 450 is implemented using Subsequent & Correlated Alarm(s) Attribute 322 added to the Alarm Attribute Library 310 as shown in FIG. 3.

In at least one embodiment, Alarm Alert 470 is automatically generated based on the information associated with the DU Startup Failure alarm 422. Alarm Alert 470 is displayed on Display Device 402. Alarm Alert 470 identifies the Primary Alarm 480 as being DU Startup Failure alarm 482. Alarm Alert 470 identifies that DU Startup Failure alarm 482 of Primary Alarm 480 is linked to Subsequent & Correlated Alarms 490. Subsequent & Correlated Alarms 490 are identified as DU Connection Failure 492, Cell Down Alarm 494, and FH & MH Connectivity Link Failure 496. Thus, DU Startup Failure alarm 482 is linked to DU Connection Failure 492, Cell Down Alarm 494, and FH & MH Connectivity Link Failure 496. Additional or different information is also able to be provided via Alarm Alert 370.

Subsequent and Correlated Alarms List 450 provides a ready reference to the list of subsequent possible alarms to enable automated fault handling so that an engineer focuses on critical alarms. Automation is able to be completed at the fingertips as Subsequent and Correlated Alarms List 450 will be readily available. Actual impact severity is easily determined, and an engineer is able to determine, based on knowledge of the operation of the network, whether an alarm is an expected alarm or an unexpected alarm. Recovery time is also minimized, and engineers develop their skills by understanding the relationship and after-effects.

Figure 5:
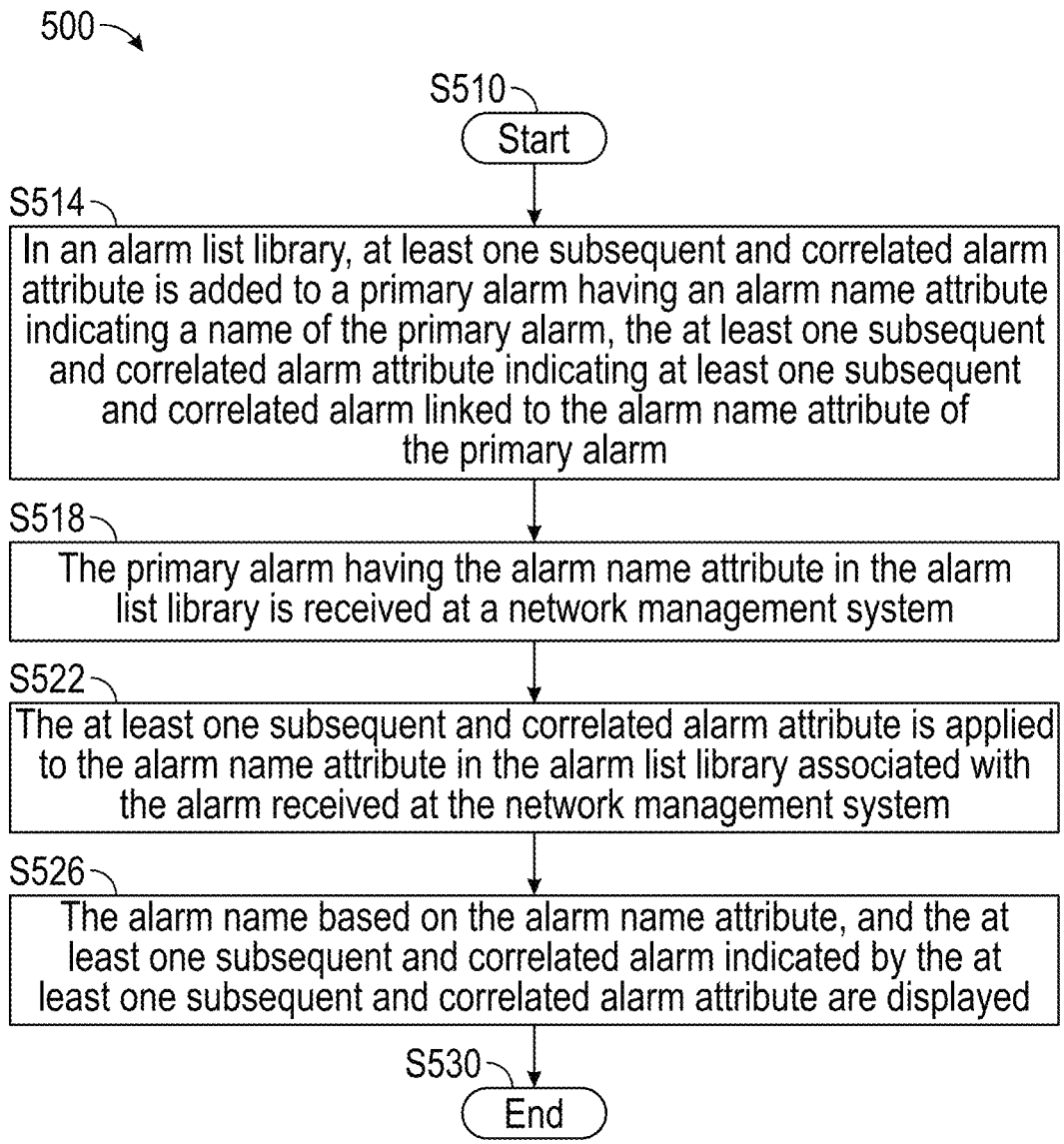
FIG. 5 is a flowchart of a method for linking at least one subsequent and correlated alarm to a primary alarm according to at least one embodiment.

FIG. 5 is a flowchart 500 of a method for linking at least one subsequent and correlated alarm to a primary alarm according to at least one embodiment.

In FIG. 5, method starts S510 and at least one subsequent and correlated alarm attribute is added in an alarm list library to a primary alarm having an alarm name attribute indicating a name of the primary alarm, the at least one subsequent and correlated alarm attribute indicating at least one subsequent and correlated alarm linked to the alarm name attribute of the primary alarm S514. Referring to FIG. 3, the Link Issue/Failure alarm 330 is shown associated with a Subsequent & Correlated Alarm(s) Attribute 322 referred to as Cell Down Alarm 340 that has been added to the Alarm Attribute Library 310. Distributed Unit (DU) Startup Failure 350 is shown associated with a plurality of Subsequent & Correlated Alarm(s) Attributes 322 that have been added to the Alarm Attribute Library 310:

At a network management system, the primary alarm having the alarm name attribute in the alarm list library is received S518. Referring to FIG. 2, NM 210 receives alarms associated with issues occurring in the mobile network. For example, a primary alarm having an alarm name attribute in an alarm list library is received.

The at least one subsequent and correlated alarm attribute is applied to the alarm name attribute in the alarm list library associated with the alarm received at the network management system S522. Referring to FIG. 2, NM 210 receives alarm attributes that are used to classify alarms. For example, in at least one embodiment, at least one subsequent and correlated alarm attribute is applied to an alarm name attribute in an alarm list library associated with the alarm received at NM 210.

The alarm name based on the alarm name attribute in the alarm list library associated with the alarm is received at the network management system, and the at least one subsequent and correlated alarm indicated by the at least one subsequent and correlated alarm attribute linked to the alarm name attribute in the alarm list library associated with the alarm received at the network management system are displayed S526. Referring to FIG. 4, in at least one embodiment, Alarm Information 406, including identification of a primary alarm and one or more subsequent and correlated alarms are automatically displayed upon detection of the primary alarm. Subsequent & Correlated Alarm(s) 450 are displayed with associated Alarm Name(s) 420. For example, in FIG. 4, Subsequent & Correlated Alarm(s) 450 are displayed along with DU Connection Failure Alarm 460, Cell Down Alarm 462, and FH & MH Connectivity/Link Failure Alarm 464. Thus, Alarm Information 406 shows that Alarm Name(s) 420 of DU Startup Failure 422 is associated with Subsequent & Correlated Alarm(s) 450 of DU Connection Failure Alarm 460, Cell Down Alarm 462, and FH & MH Connectivity/Link Failure Alarm 464.

The process then ends S530.

At least one embodiment of linking at least one subsequent and correlated alarm to a primary alarm includes adding, in an alarm list library, at least one subsequent and correlated alarm attribute to a primary alarm having an alarm name attribute indicating a name of the primary alarm, the at least one subsequent and correlated alarm attribute indicating at least one subsequent and correlated alarm linked to the alarm name attribute of the primary alarm, receiving, at a network management system, the primary alarm having the alarm name attribute in the alarm list library, applying the at least one subsequent and correlated alarm attribute to the alarm name attribute in the alarm list library associated with the alarm received at the network management system, and displaying the alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the alarm received at the network management system.

Figure 6:
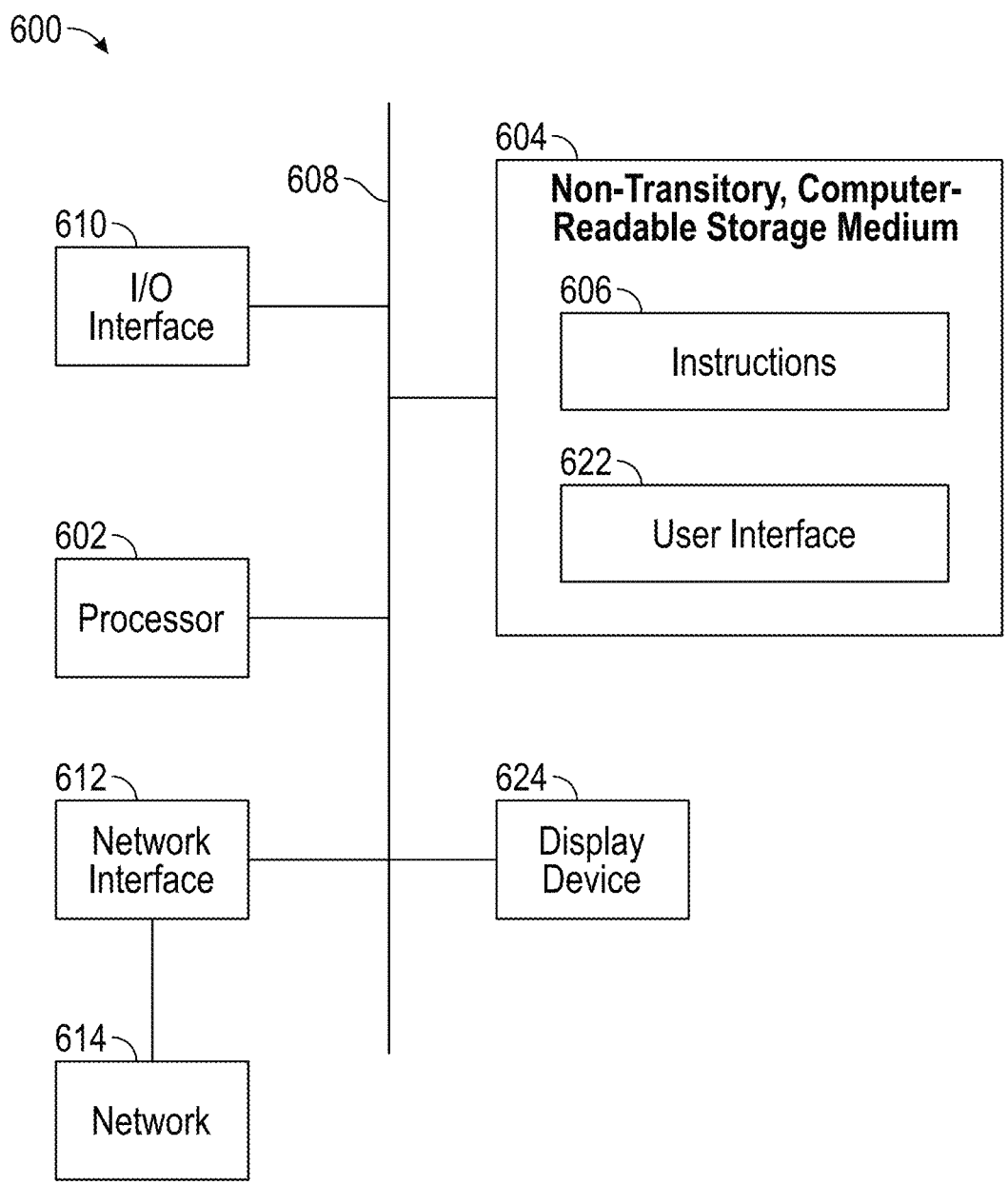
FIG. 6 is a high-level functional block diagram of a processor-based system according to at least one embodiment.

FIG. 6 is a high-level functional block diagram of a processor-based system 600 according to at least one embodiment.

In at least one embodiment, processing circuitry 600 links at least one subsequent and correlated alarm to a primary alarm. Processing circuitry 600 implements subsequent and correlated alarm lists using processor 602. Processing circuitry 600 also includes a non-transitory, computer-readable storage medium 604 that is used to implement subsequent and correlated alarm lists. Storage medium 604, amongst other things, is encoded with, i.e., stores, instructions 606, i.e., computer program code that are executed by processor 602 causes processor 602 to perform operations for providing subsequent and correlated alarm lists. Execution of instructions 606 by processor 602 represents (at least in part) an application which implements at least a portion of the methods described herein in accordance with one or more embodiments (hereinafter, the noted processes and/or methods).

Processor 602 is electrically coupled to computer-readable storage medium 604 via a bus 608. Processor 602 is electrically coupled to an Input/output (I/O) interface 610 by bus 608. A network interface 612 is also electrically connected to processor 602 via bus 608. Network interface 612 is connected to a network 614, so that processor 602 and computer-readable storage medium 604 connect to external elements via network 614. Processor 602 is configured to execute instructions 606 encoded in computer-readable storage medium 604 to cause processing circuitry 600 to be usable for performing at least a portion of the processes and/or methods. In one or more embodiments, processor 602 is a Central Processing Unit (CPU), a multi-processor, a distributed processing system, an Application Specific Integrated Circuit (ASIC), and/or a suitable processing unit.

Processing circuitry 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

Processing circuitry 600 also includes network interface 612 coupled to processor 602. Network interface 612 allows processing circuitry 600 to communicate with network 614, to which one or more other computer systems are connected. Network interface 612 includes wireless network interfaces such as Bluetooth, Wi-Fi, Worldwide Interoperability for Microwave Access (WiMAX), General Packet Radio Service (GPRS), or Wideband Code Division Multiple Access (WCDMA); or wired network interfaces such as Ethernet, Universal Serial Bus (USB), or Institute of Electrical and Electronics Engineers (IEEE) 664.

Processing circuitry 600 is configured to receive information through I/O interface 610. The information received through I/O interface 610 includes one or more of instructions, data, design rules, libraries of cells, and/or other parameters for processing by processor 602. The information is transferred to processor 602 via bus 608. Processing circuitry 600 is configured to receive information related to a User Interface (UI) 622 through I/O interface 610. The information is stored in computer-readable medium 604 as UI 622. UI 622 is presented on Display Device 624 to enable subsequent and correlated alarm attributes to be added to a primary alarm in an alarm list library and to display alarm names based on an alarm name attribute and subsequent and correlated alarms associated with a subsequent and correlated alarm attribute that is linked to the alarm name attribute in the alarm list library. In at least one embodiment, an alarm alert, including identification of a primary alarm and one or more subsequent and correlated alarms are automatically displayed on UI 622 by Display Device 624 upon detection of the primary alarm.

In one or more embodiments, one or more non-transitory computer-readable storage media 604 having stored thereon instructions (in compressed or uncompressed form) that are used to program a computer, processor, or other electronic device) to perform processes or methods described herein. The one or more non-transitory computer-readable storage media 604 include one or more of an electronic storage medium, a magnetic storage medium, an optical storage medium, a quantum storage medium, or the like. For example, the computer-readable storage media includes, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. In one or more embodiments using optical disks, the one or more non-transitory computer-readable storage media 604 includes a Compact Disk-Read Only Memory (CD-ROM), a Compact Disk-Read/Write (CD-R/W), and/or a Digital Video Disc (DVD).

In one or more embodiments, storage medium 604 stores computer program code 606 configured to cause processing circuitry 600 to perform at least a portion of the processes and/or methods for providing subsequent and correlated alarm lists. In one or more embodiments, storage medium 604 also stores information, such as algorithm which facilitates performing at least a portion of the processes and/or methods for linking at least one subsequent and correlated alarm to a primary alarm. Accordingly, in at least one embodiment, the processor circuitry 600 performs a method for providing subsequent and correlated alarm lists.

The process includes adding, in an alarm list library, at least one subsequent and correlated alarm attribute to a primary alarm having an alarm name attribute indicating a name of the primary alarm, the at least one subsequent and correlated alarm attribute indicating at least one subsequent and correlated alarm linked to the alarm name attribute of the primary alarm, receiving, at a network management system, the primary alarm having the alarm name attribute in the alarm list library, applying the at least one subsequent and correlated alarm attribute to the alarm name attribute in the alarm list library associated with the alarm received at the network management system, and displaying the alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the alarm received at the network management system.

The process for linking at least one subsequent and correlated alarm to a primary alarm has the advantages of providing subsequent and correlated alarm lists include providing a ready reference to the list of subsequent possible alarms to enable automated fault handling so that the engineer focuses on critical alarms. Automation is able to be completed at the fingertips of engineers as the subsequent and correlated alarm lists will be readily available. Actual impact severity is easily determined, and an engineer is able to determine, based on knowledge of the operation of the network, whether an alarm is an expected alarm or an unexpected alarm. Recovery time is also minimized, and engineers are able to develop their skills by understanding the relationship and after-effects.

In at least one embodiment, separate instances of these programs are executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above are able to be utilized in a variety of devices, environments, and situations. Although the embodiments have been described in language specific to structural features or methodological acts, the subject matter defined in the appended claims is not necessarily limited to the specific features or acts described. Rather, the specific features and acts are disclosed as exemplary forms of implementing the claims.

What is claimed is:

1. A method for linking at least one subsequent and correlated alarm to a primary alarm, comprising:
    adding, in an alarm list library, at least one subsequent and correlated alarm attribute to a primary alarm having an alarm name attribute indicating a name of the primary alarm, the at least one subsequent and correlated alarm attribute indicating at least one subsequent and correlated alarm linked to the alarm name attribute of the primary alarm;
    receiving, at a network management system, the primary alarm having the alarm name attribute in the alarm list library;
    applying the at least one subsequent and correlated alarm attribute to the alarm name attribute in the alarm list library associated with the alarm received at the network management system; and
    displaying the alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the alarm received at the network management system.

2. The method of claim 1, wherein the displaying the alarm name includes displaying an indication of technology associated with the alarm name.

3. The method of claim 1, wherein the displaying the alarm name further includes displaying additional attributes linked to the alarm name attribute in the alarm list library associated with the alarm received at the network management system.

4. The method of claim 1, further comprise presenting a user interface for adding, in the alarm list library, the at least one subsequent and correlated alarm attribute to the primary alarm having the alarm name attribute indicating the name of the primary alarm.

5. The method of claim 4, wherein the presenting the user interface further includes presenting a plurality of primary alarms, a one of the plurality of primary alarms being selected for adding the at least one subsequent and correlated alarm attribute to the one of the plurality of primary alarms selected from the plurality of alarms.

6. The method of claim 1, wherein the adding, in the alarm list library, the at least one subsequent and correlated alarm attribute to the primary alarm having the alarm name attribute indicating the name of the primary alarm further includes causing the at least one subsequent and correlated alarm attribute to point to an event associated with the primary alarm.

7. The method of claim 1, wherein the at least one subsequent and correlated alarm attribute indicating at least one subsequent and correlated alarm linked to the alarm name attribute of the primary alarm further includes indicating at least one subsequent and correlated alarm during an event lifetime associated with the primary alarm.

8. A device for linking subsequent and correlated alarms to a primary alarm, comprising:
    a memory storing computer-readable instructions; and
    a processor connected to the memory, wherein the processor is configured to execute the computer-readable instructions to:
        add, in an alarm list library, at least one subsequent and correlated alarm attribute to a primary alarm having an alarm name attribute indicating a name of the primary alarm, the at least one subsequent and correlated alarm attribute indicating at least one subsequent and correlated alarm linked to the alarm name attribute of the primary alarm;
        receive, at a network management system, the primary alarm having the alarm name attribute in the alarm list library;
        apply the at least one subsequent and correlated alarm attribute to the alarm name attribute in the alarm list library associated with the alarm received at the network management system; and
        display the alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the alarm received at the network management system.

9. The device of claim 8, wherein the processor is further configured to display the alarm name by displaying an indication of technology associated with the alarm name.

10. The device of claim 8, wherein the processor is further configured to display the alarm name by displaying additional attributes linked to the alarm name attribute in the alarm list library associated with the alarm received at the network management system.

11. The device of claim 8, wherein the processor is further configured to present a user interface for adding, in the alarm list library, the at least one subsequent and correlated alarm attribute to the primary alarm having the alarm name attribute indicating the name of the primary alarm.

12. The device of claim 11, wherein the processor is further configured to present a plurality of primary alarms, a one of the plurality of primary alarms being selected for adding the at least one subsequent and correlated alarm attribute to the one of the plurality of primary alarms selected from the plurality of alarms.

13. The device of claim 8, wherein the processor is further configured to cause the at least one subsequent and correlated alarm attribute to point to an event associated with the primary alarm.

14. The device of claim 8, wherein the processor is further configured to indicate at least one subsequent and correlated alarm during an event lifetime associated with the primary alarm.

15. A non-transitory computer-readable media having computer-readable instructions stored thereon, which in response to being executed by a processor causes the processor to perform operations comprising:
- adding, in an alarm list library, at least one subsequent and correlated alarm attribute to a primary alarm having an alarm name attribute indicating a name of the primary alarm, the at least one subsequent and correlated alarm attribute indicating at least one subsequent and correlated alarm linked to the alarm name attribute of the primary alarm;
- receiving, at a network management system, the primary alarm having the alarm name attribute in the alarm list library;
- applying the at least one subsequent and correlated alarm attribute to the alarm name attribute in the alarm list library associated with the alarm received at the network management system; and
- displaying the alarm name based on the alarm name attribute in the alarm list library associated with the alarm received at the network management system, and the at least one subsequent and correlated alarm indicated by the at least one subsequent and correlated alarm attribute linked to the alarm name attribute in the alarm list library associated with the alarm received at the network management system.

16. The non-transitory computer-readable media of claim 15, wherein the displaying the alarm name includes displaying an indication of technology associated with the alarm name.

17. The non-transitory computer-readable media of claim 15, wherein the displaying the alarm name further includes displaying additional attributes linked to the alarm name attribute in the alarm list library associated with the alarm received at the network management system.

18. The non-transitory computer-readable media of claim 15 further comprising presenting a user interface for adding, in the alarm list library, the at least one subsequent and correlated alarm attribute to the primary alarm having the alarm name attribute indicating the name of the primary alarm.

19. The non-transitory computer-readable media of claim 15, wherein the adding, in the alarm list library, the at least one subsequent and correlated alarm attribute to the primary alarm having the alarm name attribute indicating the name of the primary alarm further includes causing the at least one subsequent and correlated alarm attribute to point to an event associated with the primary alarm.

20. The non-transitory computer-readable media of claim 15, wherein the at least one subsequent and correlated alarm attribute indicating at least one subsequent and correlated alarm linked to the alarm name attribute of the primary alarm further includes indicating at least one subsequent and correlated alarm during an event lifetime associated with the primary alarm.

* * * * *